Patented Mar. 15, 1938

2,111,234

UNITED STATES PATENT OFFICE 2,111,234

PREPARATION OF DI-ETHERS OF TETRA-ETHYLENE GLYCOL

Glenn F. Zellhoefer, Bloomington, Ill.

No Drawing. Application August 12, 1935, Serial No. 35,883

8 Claims. (Cl. 260—151)

The present invention relates to the manufacture of the symmetrical di-ethers of tetraethylene glycol of the illustrative general formula:

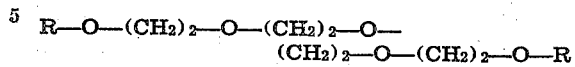

R—O—(CH₂)₂—O—(CH₂)₂—O—(CH₂)₂—O—(CH₂)₂—O—R where "R" is an alkyl radical such as methyl, ethyl, etc.

The object of this invention is to convert a mono-R-ether of ethylene glycol into an alkali metal β alkoxyethoxide, and then to displace the alkali metal from two molecules of the alkali metal β alkoxyethoxide with a di-halogen derivative of diethyl ether of the general formula (X—CH₂—CH₂)₂O, wherein "X" is a halogen from the group, chlorine, bromine, and iodine.

The invention may be carried out as hereinafter illustrated by reference specifically to "R" being the ethyl radical, to sodium as the alkali metal, and to β,β'dichlorodiethyl ether as the di-halogen diethyl ether.

Dry ethyl ether of ethylene glycol:

CH₃CH₂OCH₂CH₂OH is stirred and refluxed with a measured quantity of sodium in amount insufficient to react with all the said ethyl ether of ethylene glycol whereby the excess of said ethyl ether of ethylene glycol remains in process as a vehicle or solvent for the other materials.

By excluding moisture from access to the liquid being refluxed, all of the sodium will react by replacing hydrogen in the glycol ether to form CH₃CH₂OCH₂CH₂O—Na Thereafter β,β'dichlorodiethyl ether is added in the amount to provide sufficient chlorine for all the sodium for the formation of sodium chloride. In adding the β,β'dichlorodiethyl ether, the rate of addition is such as to control the rate of reaction. After addition of the β,β'dichlorodiethyl ether, the material is maintained at a temperature of 110 to 115° C. and stirred for approximately forty-eight hours. The liquid is then cooled, filtered and distilled. The fraction boiling at 132 to 134° C. at 4 mm. pressure (or at about 502 to 507° F. at atmospheric pressure) is diethyl ether of tetraethylene glycol:

C₂H₅O(CH₂)₂O(CH₂)₂O(CH₂)₂O(CH₂)₂OC₂H₅

The excess of the ethyl ether of ethylene glycol greatly improves the yield of the desired product and is recoverable by distillation and is not wasted.

The dimethyl ether of tetraethylene glycol is made in the same way using initially the methyl ether of ethylene glycol.

For the end product with the radical "R", it is necessary only to use the R-ether of ethylene glycol. The sodium and the chlorine unite to form sodium chloride, and the specific selection of sodium and chlorine is only a practical means to the end of uniting two molecules containing the alkali metal by the connecting link derived from the di-halogen diethyl ether. The β alkoxy-ethoxide molecules at their alkali metal linkage become attached to the halogen-containing molecule at the two halogen linkages.

The di-ethers of tetraethylene glycol of this invention are stable compounds, having general utility especially as solvents and plasticizers. Where "R" is methyl or ethyl, the dimethyl or diethyl ethers of tetraethylene glycol are excellent solvents or absorbents for refrigerants such as dichloromonofluoromethane, methyl chloride, methylene chloride and ethyl chloride.

In the accompanying claims, the process of manufacturing the materials is set forth in terms of the invention here described without limitation by or to the specific materials chosen to illustrate the invention.

What I claim is:

1. The process of producing dialkyl ethers of tetra ethylene glycol, which comprises reacting a mono alkyl ether of ethylene glycol with less than the equivalent amount of an alkali metal, and thereafter refluxing the reaction mixture with β,β.dichloro diethyl ether.

2. The process of claim 1 wherein said mono alkyl ether of ethylene glycol is the methyl ether thereof.

3. The process of claim 1 wherein said mono alkyl ether of ethylene glycol is the ethyl ether thereof.

4. The process of claim 1 wherein said alkali metal is sodium.

5. Tetra ethylene glycol dialkyl ether.

6. Tetra ethylene glycol diethyl ether.

7. Tetra ethylene glycol dimethyl ether.

8. The process of producing dialkyl ethers of tetraethylene glycol, which comprises converting a mono-alkyl ether of ethylene glycol to the alkali metal derivative, and heating said alkali metal derivative with ββ dihalodiethyl ether, to split out an alkali metal halide and produce a tetraethylene glycol dialkyl ether.

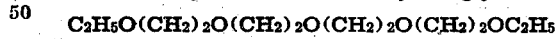

GLENN F. ZELLHOEFER.